United States Patent
Hayashi et al.

(10) Patent No.: US 7,221,629 B2
(45) Date of Patent: May 22, 2007

(54) CONTROLLER FOR AN OPTICAL DISK DRIVE, SEMICONDUCTOR INTEGRATED CIRCUIT AND OPTICAL DISK DRIVE

(75) Inventors: Yasuhiro Hayashi, Kanagawa-ken (JP); Yuuichi Miyano, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 590 days.

(21) Appl. No.: 10/650,793

(22) Filed: Aug. 29, 2003

(65) Prior Publication Data
US 2004/0052174 A1    Mar. 18, 2004

(30) Foreign Application Priority Data
Aug. 30, 2002   (JP) ............... 2002-256144

(51) Int. Cl.
G11B 5/09 (2006.01)
G11B 7/00 (2006.01)

(52) U.S. Cl. ............... 369/47.22; 369/47.31; 369/53.34

(58) Field of Classification Search ............. 369/47.22, 369/47.31, 53.34
See application file for complete search history.

(56) References Cited

U.S. PATENT DOCUMENTS 6,687,206 B1 * 2/2004 Masui ............... 369/47.19
6,693,862 B1 * 2/2004 Shigemori ............... 369/47.31
2001/0027508 A1 * 10/2001 Suzuki et al. ............... 711/111
2001/0027551 A1 * 10/2001 Suzuki et al. ............... 714/763

FOREIGN PATENT DOCUMENTS

| JP | 08-249830 | 9/1996 |
|---|---|---|
| JP | 11-345462 | 12/1999 |
| JP | 2001-357620 | 12/2001 |
| JP | 2002-109743 | 4/2002 |

* cited by examiner

Primary Examiner—William Korzuch
Assistant Examiner—Adam R. Giesy
(74) Attorney, Agent, or Firm—Oblon, Spivak, McClelland, Maier & Neustadt, P.C.

(57) ABSTRACT

A controller for an optical disk drive includes a modulator configured to modulate a record data to be recorded on a optical disk based on a record clock that is a reference clock in recording, and to generate a modulation data and an address information of the modulation data. A prepit decoder is configured to generate a prepit clock from a prepit signal detected from the optical disk, and a decision circuit is configured to determine whether or not recording in accordance with a standard is performed, from phase characteristic based on the address information and the prepit clock, and to control a frequency of the record clock.

22 Claims, 15 Drawing Sheets

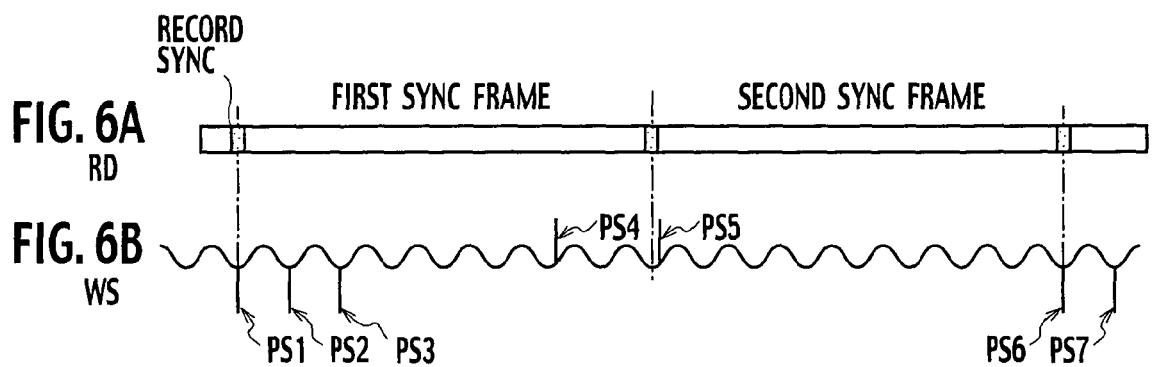
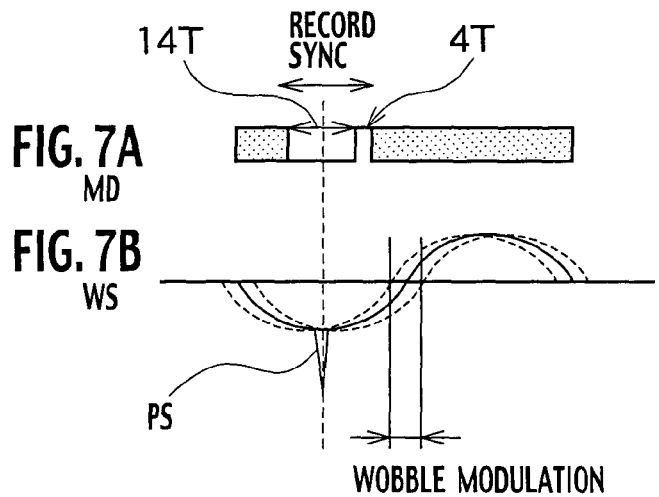

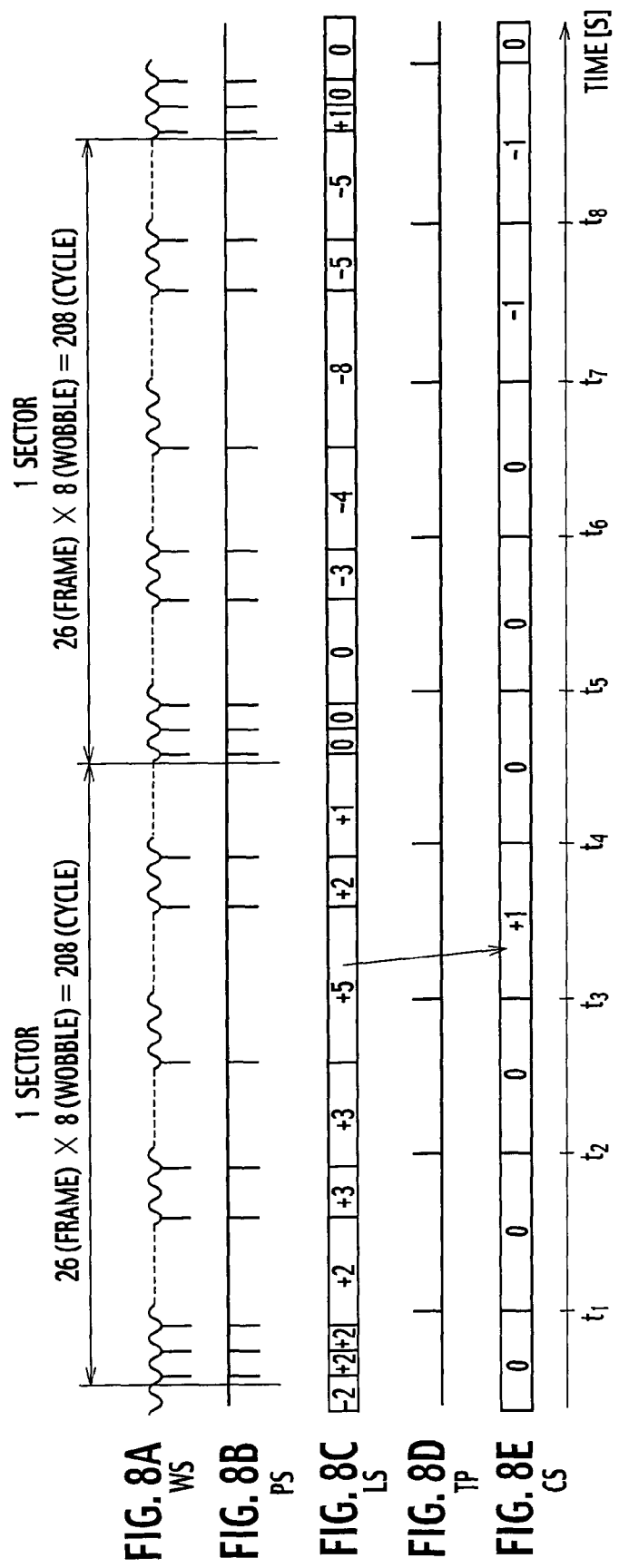

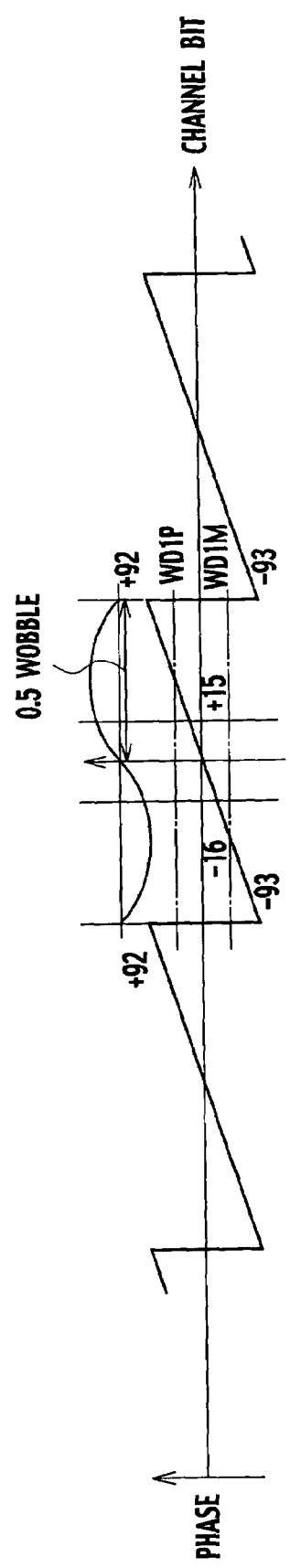

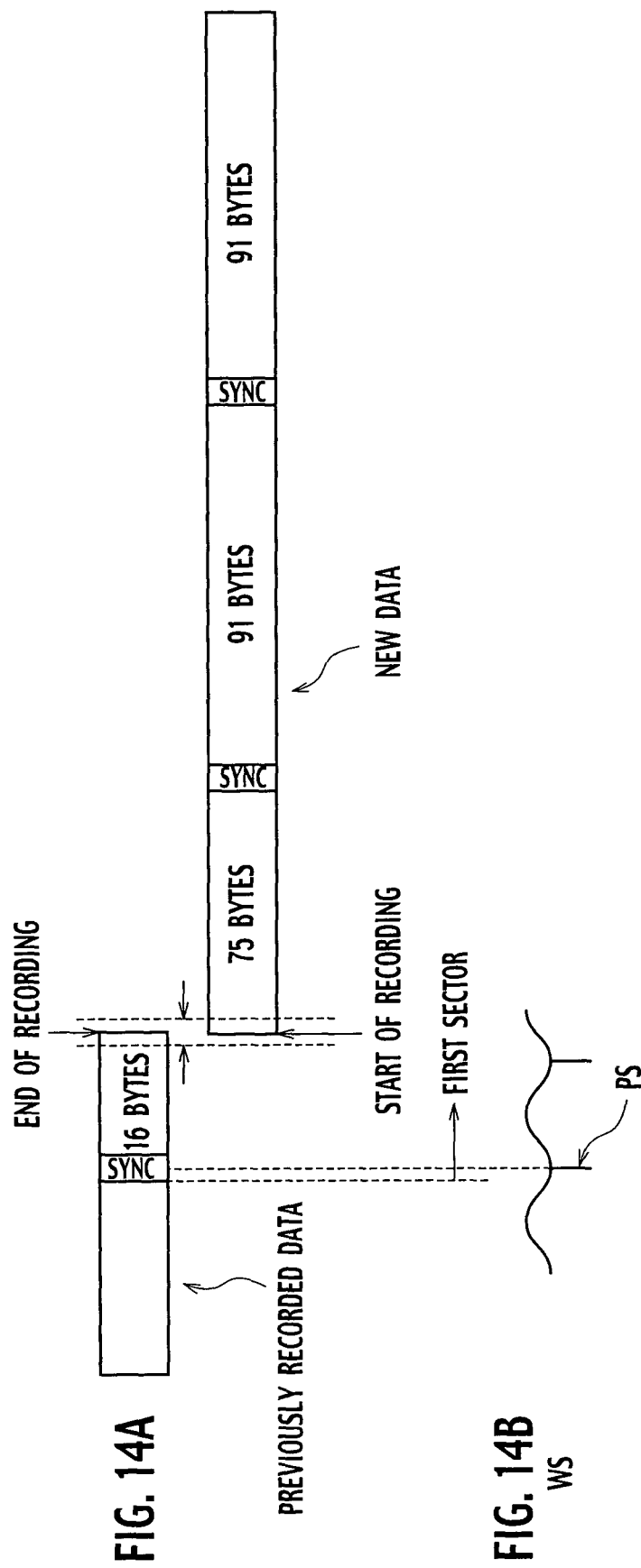

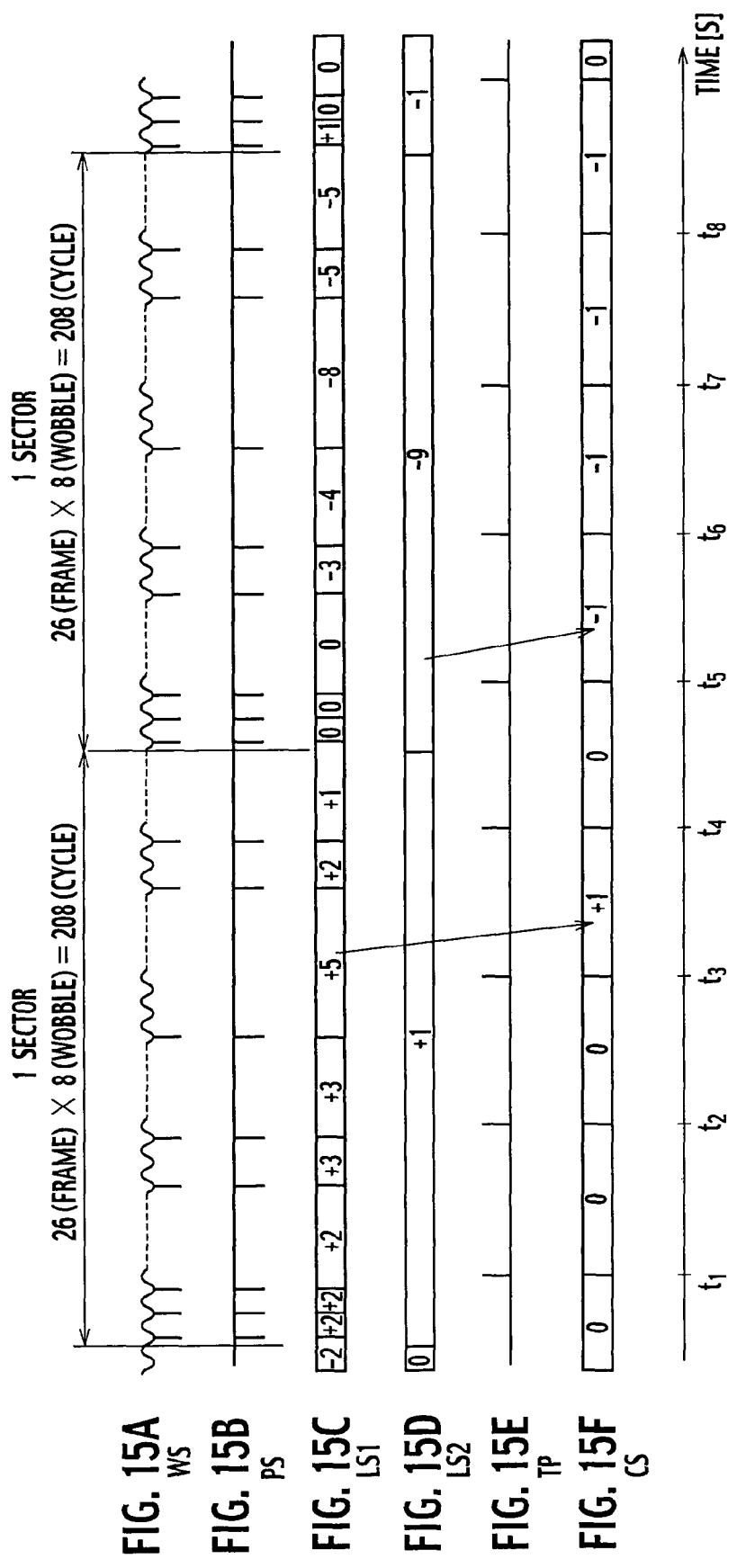

US 7,221,629 B2

CONTROLLER FOR AN OPTICAL DISK DRIVE, SEMICONDUCTOR INTEGRATED CIRCUIT AND OPTICAL DISK DRIVE

CROSS REFERENCE TO RELATED APPLICATION

This application is based upon and claims the benefit of priority from the prior Japanese Patent Applications No. P2002-256144, filed on Aug. 30, 2002; the entire contents of which are incorporated herein by reference.

BACKGROUND OF THE INVENTION

1. Field of the Invention

The present invention relates to an optical disk drive and, more particularly, to a controller for the optical disk drive and a semiconductor integrated circuit monolithically integrating the controller on a single semiconductor chip.

2. Description of the Related Art

A compact disk-recordable/rewritable (CD-R/RW) device is available as a recordable optical disk. Moreover, digital versatile disk-recordable/rewritable (DVD-RW) and digital versatile disk+recordable/rewritable (DVD+RW) devices are available as optical disks, which have a large-capacity compared to the CD-R/RW. In recording, "additional write", i.e., writing new data which includes previously recorded data on the optical disk is offer necessary. A standard has been established such that an end of the previously recorded data and an initial point of new data coincide with each other within an accuracy of ±1 byte.

In order to permit the additional write in accordance with the standard, a method of recording new data on the optical disk by use of an information signal as a reference has been proposed (hereinafter referred to as "first background art"). The information signal is obtained from the optical disk. Also, a method of recording new data on the optical disk based on a wobble clock obtained by multiplying a wobble signal has been proposed (hereinafter referred to as "second background art").

In the first background art, when the previously recorded data on the optical disk deviates from the standards, the new data deviates from the prepits and a wobble. Furthermore, in a digital versatile disk (DVD) drive and the like, a track pitch is narrower than the size of a beam spot. As a result, crosstalk often occurs between tracks. Under the influence of the wobble of adjacent tracks on the optical disk, the wobble signal is subjected to an amplitude modulation (AM) and a frequency modulation (FM). When the wobble signal undergoes the AM and the FM modulation, an error occurs in the wobble clock.

Therefore, according to the second background art, it is difficult to maintain phases of the record sync and prepits constantly, by use of the wobble clock as the reference. Furthermore, when the previously recorded data on the optical disk deviates from the standard, new data is recorded in accordance with prepits and the wobble, while ignoring the deviating data. If the new data is recorded while ignoring the previously recorded deviation data, there is a possibility that the previously recorded data will be destroyed.

SUMMARY OF THE INVENTION

An aspect of the present invention inheres in a controller for an optical disk drive encompassing, a modulator configured to modulate record data to be recorded on an optical disk based on a record clock which is a reference clock for recording, and to generate modulation data and address information of the modulation data, a prepit decoder configured to generate a prepit clock from a prepit signal detected from the optical disk, and a decision circuit configured to determine whether recording in accordance with a standard is performed, from a phase characteristic based on the address information and the prepit clock, and to control a frequency of the record clock.

Another aspect of the present invention inheres in a semiconductor integrated circuit encompassing, a modulator integrated on semiconductor chip and configured to modulate a record data to be recorded on a optical disk based on a record clock that is a reference clock for recording, and to generate a modulation data and an address information of the modulation data, a prepit decoder integrated on the semiconductor chip and configured to generate a prepit clock from a prepit signal detected from the optical disk, and a decision circuit integrated on the semiconductor chip and configured to determine whether or not recording in accordance with a standard is performed, from phase characteristic based on the address information and the prepit clock, and to control a frequency of the record clock.

Still another aspect of the present invention inheres in an optical disk drive encompassing, a pickup configured to read light reflected from an optical disk, the reflected light generated by irradiating a laser beam on the optical disk, and to generate a prepit signal and a wobble signal, a controller configured to determine whether recording in accordance with an established standards is performed, from phase characteristic based on the prepit signal and the wobble signal, and to modulate record data to be recorded on the optical disk, and a signal processor configured to supply the record data to the controller.

BRIEF DESCRIPTION OF THE DRAWINGS

FIGS. 6A and 6B are schematic diagrams showing a relationship of a prepit signal and a record sync in the optical disk drive according to the first embodiment of the present invention;

FIGS. 7A and 7B are schematic diagrams showing a relationship of a wobble signal and a record sync in the optical disk drive according to the first embodiment of the present invention;

FIGS. 8A–8E are time charts showing an operation of the controller according to the first embodiment of the present invention;

FIG. 9 is schematic diagram showing a function of a decision circuit according to the first embodiment of the present invention;

FIGS. 14A and 14B are schematic diagram showing states of frames in a addition writing of the record controller according to the second embodiment of the present invention;

FIGS. 15A–15F are time charts showing an operation of the controller according to the second embodiment of the present invention;

DETAILED DESCRIPTION OF EMBODIMENTS

Figure 1:
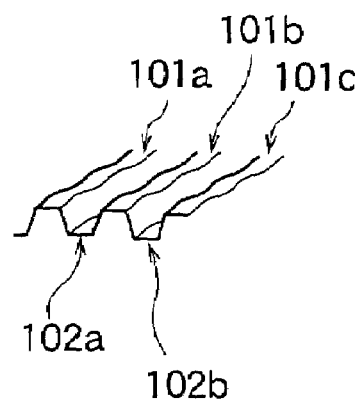
FIG. 1 is a schematic view showing configurations of lands and grooves on an optical disk.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

Figure 2:
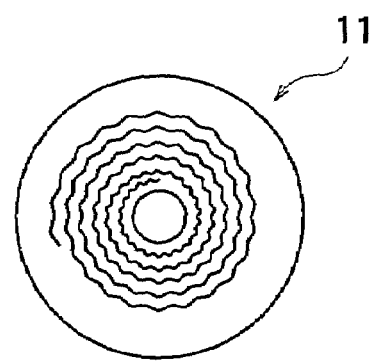
FIG. 2 is a schematic diagram showing a spiral configuration of the optical disk.
Figure 3:
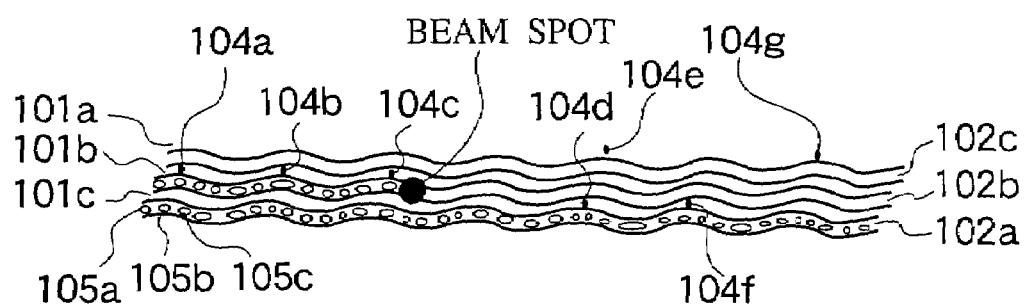
FIG. 3 is a schematic plan view showing configurations of the lands and the grooves.

As shown in FIG. 1, in order to guide a pickup that reads a reflected light by irradiating a laser beam on an optical disk, a CD-R/RW, a DVD-R/RW and a DVD+R/RW have grooves 102a, 102b, . . . and lands 101a, 101b, . . . As shown in FIG. 2, the grooves 102a, 102b, . . . and the lands 101a, 101b, . . . wobble at a constant period in a radial direction of the optical disk 11, i.e., the lands and grooves have a "wobbling" characteristic. A track structure of the optical disk 11 as shown in FIGS. 1 and 2 is called a "wobbled land groove". As shown in FIG. 3, prepits 104a, 104b, . . . are inscribed in the lands 101a, 101b, . . . , particularly in the DVD-R/RW. Furthermore, pits 105a, 105b, . . . are formed by the laser beam irradiated from the pickup. A wobble signal, a prepit signal and an information signal are generated from a signal read out from the optical disk 11 by the pickup. The wobble signal is generated in accordance with the wobble shown in FIG. 2. The prepit signal is generated in accordance with the prepits 104a, 104b, . . . shown in FIG. 3.

(First Embodiment)

Figure 4:
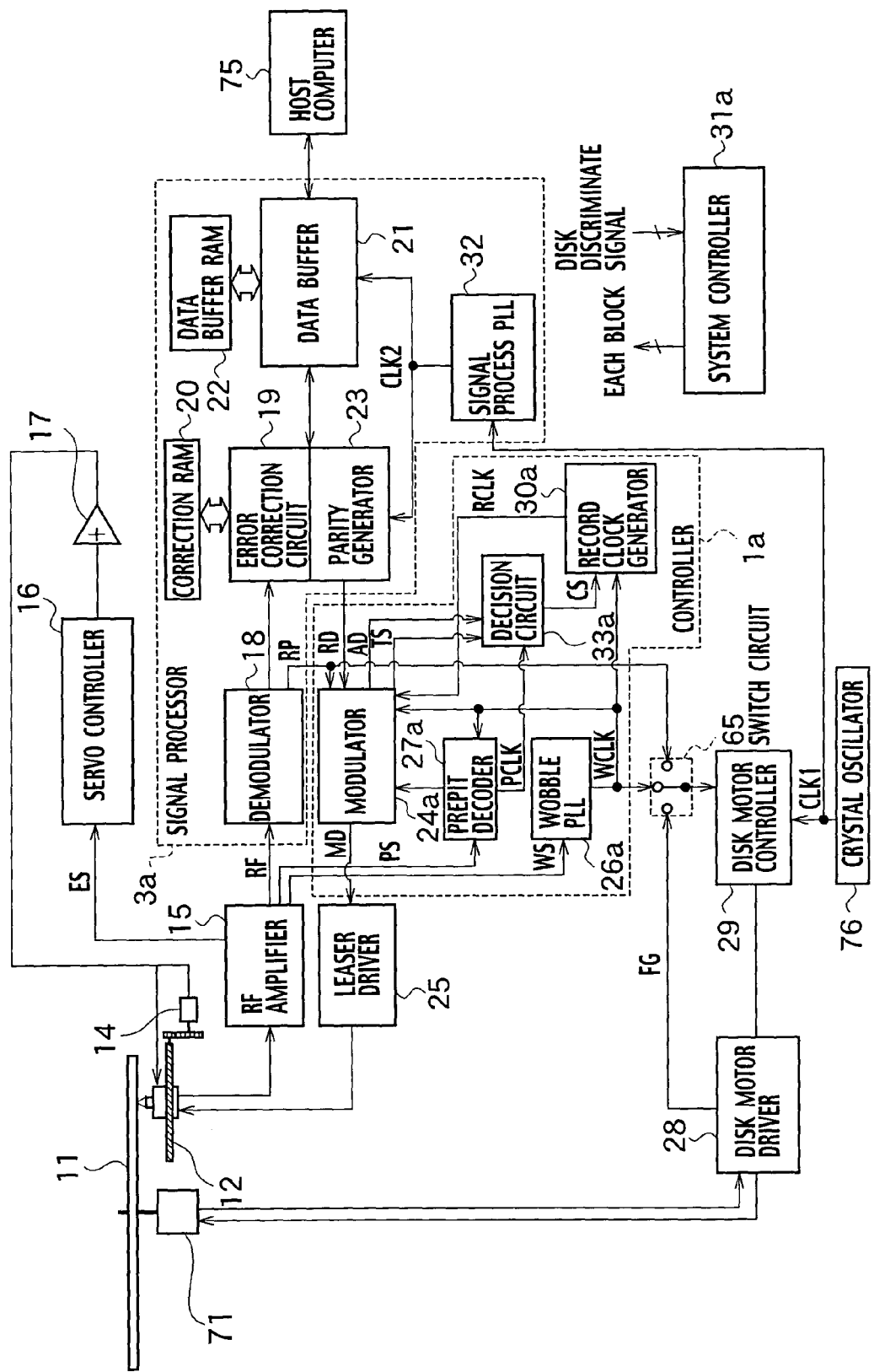
FIG. 4 is a block diagram showing an optical disk drive according to a first embodiment of the present invention.

As shown in FIG. 4, an optical disk drive according to a first embodiment of the present invention includes an optical disk 11, a pickup configured to receive light reflected from a laser beam irradiated on the optical disk 11, and to generate a prepit signal PS and a wobble signal WS. Also included is a controller 1a configured to determine whether or not recording in accordance with the standards is performed, based on phase characteristic of the prepit signal PS and the wobble signal WS, and to modulate record data RD which is to be recorded on the optical disk 11. A signal processor 3a is provided and configured to supply the record data RD to the controller 1a. Furthermore, the optical disk drive according to the first embodiment includes a disk motor 71 configured to drive the optical disk 11, a servo controller 16 configured to control operation of the pickup 12 based on an error signal ES detected by the pickup 12, a laser driver 25 configured to drive a laser in the pickup 12 based on a modulation data MD supplied from the controller 1a, a disk motor controller 29 configured to control rotation of the disk motor 71, a crystal oscillator 76 configured to supply a reference clock CLK1 to the disk motor controller 29 and the signal processor 3a, and a system controller 31a configured to control the entire system in accordance with operation modes such as recording and reproducing data.

An optical detector (not illustrated) inside the pickup 12 is divided into four sections, A to D. A radio frequency (RF) amplifier 15 performs a matrix operation on each of the signals detected by the respective A to D sections, and generates the prepit signal PS, the wobble signal WS, the information signal RF and the error signal ES. The controller 1a includes a modulator 24a configured to modulate the record data RD based on a record clock RCLK, used as a reference clock in recording, and to generate the modulation data MD and an address information AD of the modulation data MD, a prepit decoder 27a configured to generate a prepit clock PCLK from the prepit signal PS detected from the optical disk 11, and a decision circuit 33a configured to determine whether or not recording in accordance with the standard is performed from phase characteristic based on the address information AD and the prepit clock PCLK, and to control a frequency of the record clock RCLK. The controller 1a further includes a wobble PLL 26a configured to generate a wobble clock WCLK based on the wobble signal WS, and a record clock generator 30a configured to generate the record clock RCLK.

Figure 5:
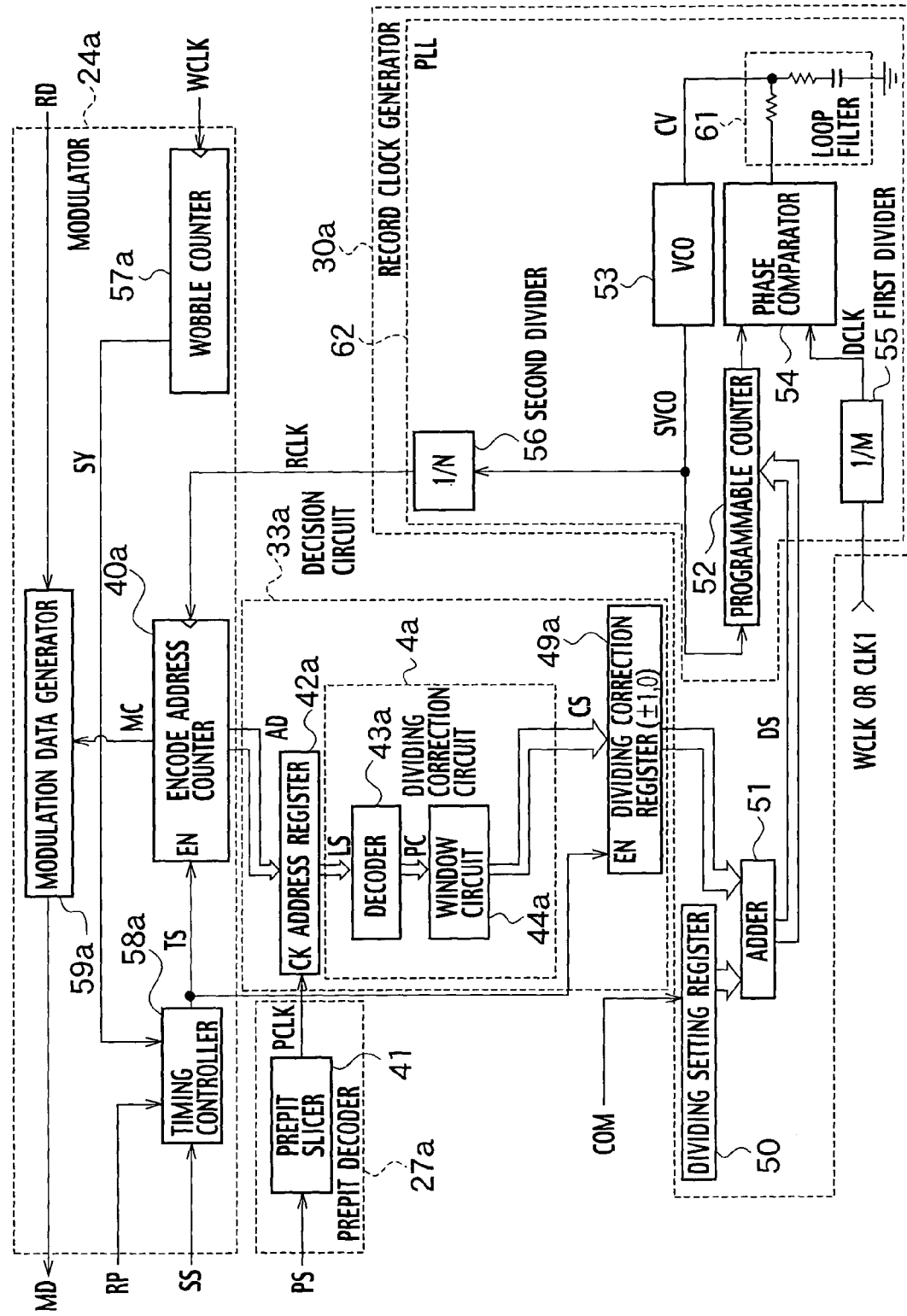
FIG. 5 is a block diagram showing a controller for the optical disk drive according to the first embodiment of the present invention.

Furthermore, as shown in FIG. 5, the modulator 24a includes a wobble counter 57a configured to generate a sector synchronization signal SY by counting the wobble clock WCLK, a timing controller 58a configured to generate a timing signal TS in synchronization with any one of the sector synchronization signal SY and a reproducing synchronization signal RP, an encode address counter 40a configured to generate a modulation control signal MC and the address information AD by counting the record clock RCLK when the timing signal TS is effective, and a modulation data generator 59a configured to modulate the record data RD based on the modulation control signal MC. In the case of recording new data on the optical disk 11 by use of the previously recorded data, that is, the information signal RF is used as a reference, the timing controller 58a generates the timing signal TS in accordance with the reproducing synchronization signal RP. On the other hand, in the case of recording new data on the optical disk 11 by use of the wobble clock WCLK as a reference, the timing controller 58a generates the timing signal TS in synchronization with the sector synchronization signal SY. In the DVD drive, the address information AD embedded in the modulation data MD is called "logic ID".

The prepit decoder 27a includes a prepit slicer 41 configured to generate the prepit clock PCLK by subjecting the prepit signal PS to waveform shaping. Note that the prepit decoder 27a generates physical address information of the optical disk 11 in accordance with the prepit signal PS and the wobble clock WCLK. The physical address information of the optical disk 11 is supplied to the modulator 24a. The physical address information of the optical disk 11 is utilized for generating a record start signal SS to be supplied to the timing controller 58a.

The decision circuit 33a includes an address register 42a having a clock input terminal CK connected to the prepit decoder 27a and an input side connected to the modulator 24a, a dividing correction circuit 4a connected to the address register 42a, and a dividing correction register 49a having an enable terminal EN connected to the timing controller 58a and an input side connected to the dividing correction circuit 4a. The address register 42a latches the address information AD of the modulation data MD in synchronization with the prepit clock PCLK. The dividing correction circuit 4a generates a dividing correction signal CS based on latched address information AD. The dividing correction register 49a latches the dividing correction signal CS when the timing signal TS is effective.

The dividing correction circuit 4a includes a decoder 43a connected to the address register 42a, and a window circuit 44a connected between the decoder 43a and the dividing correction register 49a. The decoder 43a generates the phase characteristic PC from the latched address information AD. The window circuit 44a generates the dividing correction signal CS by comparing the phase characteristic PC to a window value. Moreover, the window circuit 44a has a positive window value and a negative window value. The window circuit 44a determines to which one of three patterns the phase characteristic PC corresponds. Specifically, the window circuit 44a determines whether the phase characteristic PC is a value larger than the positive window value or a value smaller than the negative window value or a value between the negative window value and the positive window value, inclusive. When the phase characteristic PC supplied from the decoder 43a is a value larger than the positive window value, the window circuit 44a supplies "+1" to the dividing correction register 49a. On the other hand, when the phase characteristic PC is a value smaller than the negative window value, the window circuit 44a supplies "−1" to the dividing correction register 49a. When the phase characteristic PC is a value between the negative window value and the positive window value, inclusive, the window circuit 44a supplies "0" to the dividing correction register 49a.

Furthermore, the record clock generator 30a includes a dividing setting register 50 configured to receive a command COM, an adder 51 having one input connected to the dividing setting register 50 and the other input connected to the dividing correction register 49a, and a PLL 62 connected to the adder 51. The command COM generated by the system controller 31a shown in FIG. 4 is supplied to the dividing setting register 50. The dividing setting register 50 generates a reference dividing signal in accordance with the command COM. The adder 51 generates a dividing control signal DS by adding up the reference dividing signal and the dividing correction signal CS. The PLL 62 generates the record clock RCLK based on the dividing control signal DS.

The PLL 62 includes a voltage controlled oscillator (VCO) 53 configured to generate an oscillation clock SVCO by oscillating at a frequency corresponding to a control voltage CV, a programmable counter 52 configured to change a dividing ratio by use of the dividing control signal DS, and to divide the oscillation clock SVCO, a first divider 55 configured to generate a dividing clock DCLK by dividing any one of the reference clock CLK1 and the wobble clock WCLK, a phase comparator 54 configured to generate the control voltage CV in accordance with a phase difference between the divided oscillation clock SVCO and the dividing clock DCLK, a loop filter 61 configured to extract a low frequency component of the control voltage CV, and to supply the component to the VCO 53, and a second divider 56 configured to generate the record clock RCLK by dividing the oscillation clock SVCO. The dividing ratio of the programmable counter 52 is increased when the dividing correction signal CS from the window circuit 44a is "+1". On the other hand, the dividing ratio of the programmable counter 52 is decreased when the dividing correction signal CS is "−1".

The signal processor 3a and the servo controller 16, which are shown in FIG. 4, supply a disk discrimination signal for discriminating the type of the optical disk 11 to the system controller 31a. Based on the disk discrimination signal, the system controller 31a determines the type of the optical disk 11. In accordance with the type of optical disk 11, the system controller 31a supplies the command COM to the dividing setting register 50 and determines a reference frequency of the record clock RCLK.

Furthermore, the reproducing synchronization signal RP supplied from the demodulator 18 shown in FIG. 4 is transmitted to a switch circuit 65. A rotation frequency signal FG from the disk motor 71 is supplied to the disk motor controller 29, and the disk motor 71 is controlled so that the rotation frequency signal FG has a constant period. The switch circuit 65 switches between the wobble clock WCLK, the rotation frequency signal FG, and the reproducing synchronization signal RP in accordance with an operation mode signal from the system controller 31a. Any one of the wobble clock WCLK, the rotation frequency signal FG, and the reproducing synchronization signal RP, which is selected by the switch circuit 65, is supplied to the disk motor controller 29. The disk motor controller 29 compares the signal selected by the switch circuit 65 to the reference clock CLK1 and controls a disk motor driver 28 in accordance with the comparison result. Note that two methods can be used for controlling the disk motor 71, a constant angular velocity (CAV) method and a constant linear velocity (CLV) method. An optical disk drive for a DVD and the like generally adopts the CLV method in recording and the CAV method in reproducing.

In reproducing data, the information signal RF generated by the RF amplifier 15 is transmitted to a host computer 75 via the demodulator 18, an error correction circuit 19, a correction RAM 20, a data buffer 21, and a data buffer RAM 22. On the other hand, in recording data, data from the host computer 75 is supplied to the modulator 24a via the data buffer 21, the data buffer RAM 22 and a parity generator 23. The modulator 24a modulates the record data RD to which parities are added.

The error correction circuit 19, the data buffer 21, and the parity generator 23 operate in synchronization with a clock generated by a signal process PLL 32. The modulator 24a operates in synchronization with the record clock RCLK generated by the record clock generator 30a. The record clock RCLK is generated by the record clock generator 30a based on the wobble clock WCLK. The servo controller 16 drives a feed motor 14 and tracking and focus actuators inside the pickup 12 via a driver 17 based on the error signal ES.

The record data RD as shown in FIG. 6A has record syncs at the heads of each sync frame. The RF amplifier 15 generates the wobble signal WS and prepit signals PS1, PS2, ... as shown in FIG. 6B. The prepit signals PS1 to PS3, PS6 and PS7 correspond to prepits of a track traced by the pickup 12 and occur at peak positions of a waveform of the wobble signal WS. The prepit signals PS4 and PS5 occur at positions corresponding with prepits of a track adjacent to the track traced by the pickup 12. When the prepits of the adjacent track and the prepits of the traced track overlap with each other and are canceled out by interfering with each other, the standards prescribe that the prepits of the traced track are shifted by one frame to the head of a subsequent frame. As to the prepits of the optical disk 11, a maximum of three prepits are inscribed at peak positions of three periods of a wobble in a frame head in accordance with the DVD standards. In the case of a DVD, the period of the wobble, when converted into channel bits of data, is a period of 186 channel bits. Since the standards prescribe that a recording/reproducing frequency of the channel bits is to be 26.16 MHz, the wobble frequency is 26.16 MHz/186=140.6 kHz. The prepits on the optical disk 11 are inscribed so as to form one code by a unit of an error correction coding (ECC) block on a DVD data format. A set of prepit data includes three or two prepit signals PS. Moreover, one set of the prepit data is recorded for every two frames.

Moreover, the standard prescribes that recording positions of the record syncs inserted into the new data and the positions of prepits on the optical disk 11 must coincide with each other. As shown in FIG. 7A, a signal section of the record sync, when converted into a channel bit, includes 14T at the low level and 4T at the high level or 14T at the high level and 4T at the low level. Furthermore, the standard requires that center positions of 14T of the record sync and the positions of the prepits coincide with each other. As shown in FIG. 7B, a phase of the prepit signal PS is not modulated, unlike the wobble signal WS. When converted into channel bits, the oscillation of the wobble signal WS due to this wobble modulation corresponds to ±16 to 20 channel bits. Accordingly, the controller 1a allows the center of 14T of the record sync of the modulation data MD shown in FIG. 7A and the timing of the prepit signal PS shown in FIG. 7B to coincide with each other.

Next, an operation of the controller 1a according to the first embodiment of the present invention will be described by using FIGS. 4 to 10.

(A) As shown in FIG. 8A, the RF amplifier 15 shown in FIG. 4 generates the wobble signal WS similar to the meandering of the wobble. Assuming that signals obtained from the A to D sections of the optical detector inside the pickup 12 are signals A to D, respectively, the wobble signal WS is generated by a matrix operation of (A+B)−(C+D). As shown in FIGS. 8A and 8B, the numbers of occurring prepits differ from each other depending on frames. The wobble signal WS generated by the RF amplifier 15 is supplied to the wobble PLL 26a. The wobble PLL 26a binarizes the wobble signal WS and, thereafter, multiplies the binarized signal. Thus, the wobble clock WCLK is generated. The wobble clock WCLK is supplied to the modulator 24a and the record clock generator 30a. Furthermore, the wobble clock WCLK is supplied to the wobble counter 57a inside the modulator 24a shown in FIG. 5.

(B) Next, the wobble counter 57a generates the sector synchronization signal SY by counting the wobble clock WCLK. The sector synchronization signal SY is supplied to the timing controller 58a shown in FIG. 5. The record start signal SS is also supplied to the timing controller 58a, in addition to the sector synchronization signal SY. When a recording operation is started, the timing signal TS is generated. When the timing signal TS is generated, the encode address counter 40b starts counting the record clock RCLK.

(C) The encode address counter 40a counts the record clock RCLK and generates the modulation control signal MC and the address information AD of the modulation data MD. The modulation data generator 59a generates a bit clock in accordance with the modulation control signal MC and performs 8-16 modulation in synchronization with the record clock RCLK. The address information AD of the modulation data MD, which is generated by the encode address counter 40a, is supplied to the address register 42a. Moreover, the prepit signal PS is subjected to waveform shaping by the prepit slicer 41 inside the prepit decoder 27a and becomes the prepit clock PCLK. The prepit clock PCLK is supplied to the address register 42a inside the decision circuit 33a.

(D) In synchronization with the prepit clock PCLK, the address register 42a latches the address information AD generated by the encode address counter 40a. As a result, a positional relationship between the address value of the address information AD and the prepit signal PS can be obtained, as shown in FIG. 8C. The latch signal LS generated by the address register 42a is supplied to the decoder 43a shown in FIG. 5. The decoder 43a generates the phase characteristic PC on the basis of a point with which the modulation data MD should be synchronous in accordance with the standards. Specifically, based on a positional relationship between the prepit signal PS and the record sync of the modulation data MD, the decoder 43a obtains an error between the prepit and the address value of the center position of 14T of the record sync. Furthermore, as shown in FIG. 9, the decoder 43a generates the phase characteristic PC based on an error between the prepit and the address value of the center position of 14T of the record sync. The phase characteristic PC generated by the decoder 43a is supplied to the window circuit 44a.

(E) The window circuit 44a compares the phase characteristic PC generated by the decoder 43a to the window value at a specific timing. Here, it is assumed that the positive and negative window values of the window circuit 44a are set to "+4" and "−4", respectively. As shown in FIG. 9, in the phase characteristic PC, only the characteristic during one wobble has a linear region. The window circuit 44a compares the phase characteristic PC to the window value in synchronization with a phase decision timing pulse TP shown in FIG. 8D. The phase decision timing pulse TP is supplied, for example, from the system controller 31a. In the window circuit 44a, the phase characteristic PC is "+2" at time t1, which is between the negative window value and the positive window value, inclusive. Therefore, as shown in FIG. 8E, "0" is generated as the dividing correction signal CS. The phase characteristic PC is "+3" at time t2, which is between the negative window value and the positive window value, inclusive. Therefore a "0" is generated. The phase characteristic PC is "+5" at time t3, which is larger than the positive window value, and therefore the window circuit 44a generates "+1". The phase characteristic PC is "+1" at time t4, which is between the negative window value and the positive window value inclusive, and therefore the window circuit 44a generates "0". The phase characteristic PC is "0" at time t5, which is between the negative window value and the positive window value, inclusive, and therefore the window circuit 44a generates "0". The phase characteristic PC is "−4" at time t6, which is between the negative window value and the positive window value inclusive, and therefore the window circuit 44a generates "0". The phase characteristic PC is "−8" at time t7, which is smaller than the negative window value, and therefore the window circuit 44a generates "−1". The phase characteristic PC is "−5" at time t8, which is smaller than the negative window value, and therefore the window circuit 44a generates "−1". The dividing correction signals CS generated by the window circuit 44a are supplied to the dividing correction register 49a.

(F) The dividing correction register 49a latches the dividing correction signals CS generated by the window circuit 44a and supplies the dividing correction signals CS to the adder 51. The adder 51 adds up the dividing correction signals CS from the dividing correction register 49a and the reference dividing signal from the dividing setting register 50. The dividing correction signals CS and the reference dividing signal, which are added up by the adder 51, are supplied to the programmable counter 52 of the PLL 62. When the output of the window circuit 44a is "−1", an input signal from the optical disk 11 is delayed in comparison with the modulation control signal MC generated by the encode address counter 40a. When the output of the window circuit 44a is "+1", the input signal from the optical disk 11 is ahead of the modulation control signal MC generated by the encode address counter 40a. The adder 51 supplies the dividing control signal DS to the programmable counter 52. The programmable counter 52 controls an oscillation frequency of the VCO 53. The oscillation clock SVCO generated by the VCO 53 is divided by the second divider 56 and is supplied as the record clock RCLK to the encode address counter 40a.

As described above, according to the first embodiment, in the case of recording new data on the basis of previously recorded data, phases of the modulation data MD and the wobble signal WS are detected so as to conform to the prepit signal PS and the wobble signal WS, and the frequency of the record clock RCLK is modulated in minute scales. By modulating the frequency of the record clock RCLK, even when the recording starting position is largely deviated from its original link position, an original recording state in accordance with the established standards during recording. Moreover, in the case of recording new data on the basis of the wobble signal WS, the modulation data MD can be recorded in accordance with the established standards based on the prepit signal PS and the wobble signal WS in the process of the recording operation. As a result, in any of the cases of starting the additional write in synchronization with the wobble signal WS and of starting the additional write in conjunction with the previously recorded data, recording in accordance with the established standards can be performed on the optical disk 11 while executing the recording operation.

Figure 10:
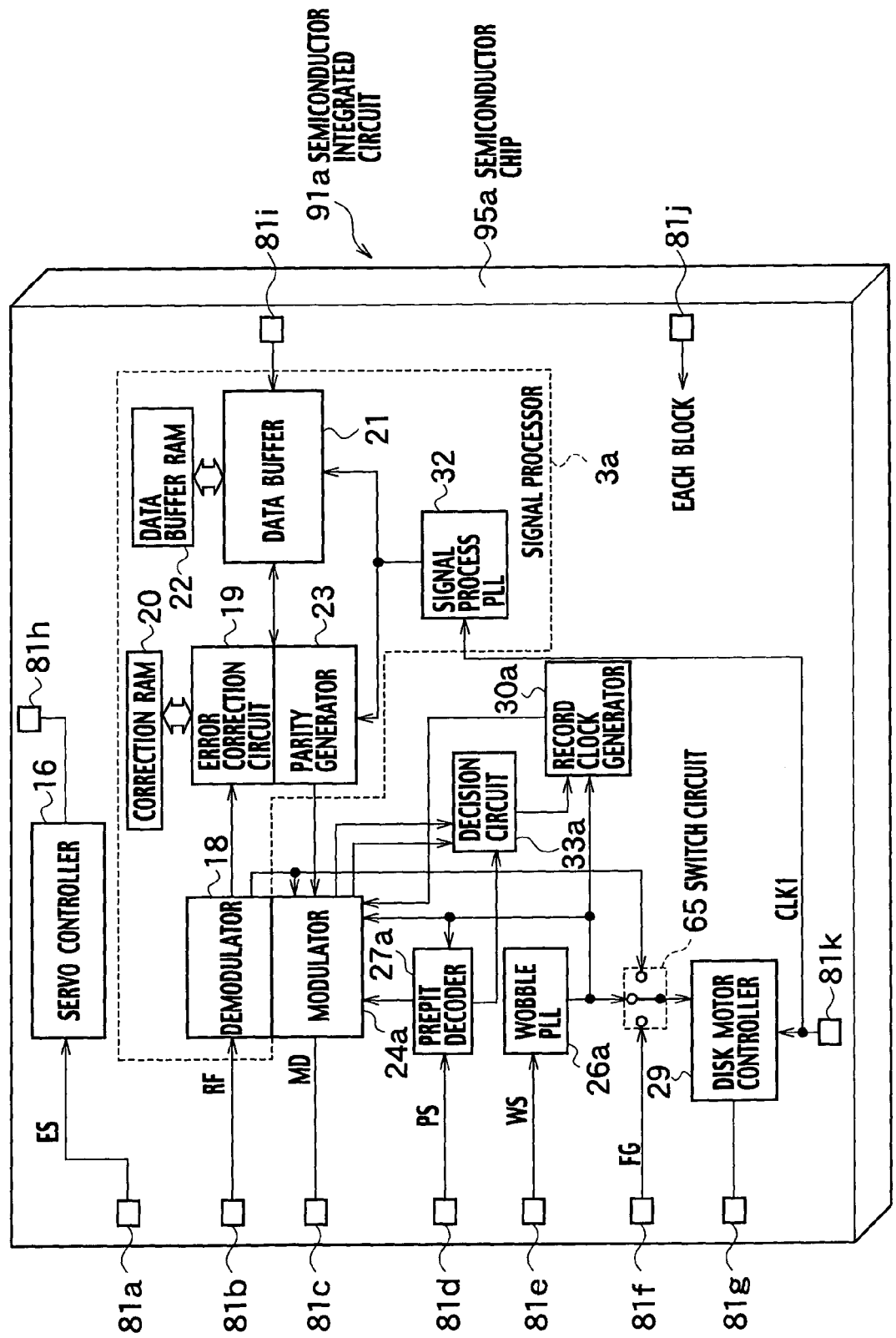
FIG. 10 is a schematic diagram showing a configuration integrated the controller according to the first embodiment of the present invention monolithically on the same semiconductor chip.

As shown in FIG. 10, for example, the modulator 24a, the prepit decoder 27a, wobble PLL 26a, the decision circuit 33a, and the record clock generator 30a can be monolithically integrated on a semiconductor chip 95a and a semiconductor integrated circuit 91a can be formed. In the example shown in FIG. 10, the semiconductor integrated circuit 91a further includes the servo controller 16, the signal processor 3a, the disk motor controller 29, and bonding pads 81a to 81k.

The bonding pad 81a is an internal terminal for transmitting the error signal ES supplied from the RF amplifier 15 to the servo controller 16. The bonding pad 81b is an internal terminal for transmitting the information signal RF supplied from the RF amplifier 15 to the demodulator 18. Similarly, the bonding pad 81c is electrically connected to the modulator 24a. The bonding pad 81d is electrically connected to the prepit decoder 27a. The bonding pad 81e is electrically connected to the wobble PLL 26a. The bonding pad 81f is electrically connected to the switch circuit 65. The bonding pad 81g is electrically connected to the disk motor controller 29. The bonding pad 81i is electrically connected to the data buffer 21. The bonding pad 81j is electrically connected to the each block shown in FIG. 10. The bonding pad 81k is electrically connected to the disk motor controller 29 and the signal process PLL 32.

More specifically, the bonding pads 81a to 81k are connected to, for example, a plurality of high impurity concentration regions (source region/drain region) formed in and at the surfaces of active area assigned to the surface of the semiconductor chip 95a, where donors or acceptors are doped with a concentration of approximately $1 \times 10^{18}$ to $1 \times 10^{21}$ cm$^{-3}$. A plurality of electrode layers made from a metal such as aluminum (Al) or an aluminum alloy (Al—Si, Al—Cu—Si) are formed so as to implement ohmic contacts with the plurality of high impurity concentration regions. On the top surface of such a plurality of electrode layers, a passivation film such as a silicon oxide film ($SiO_2$), a phosphosilicate glass (PSG) film, a boro-phosphosilicate glass (BPSG) film, a silicon nitride film ($Si_3N_4$), or a polyimide film, is deposited.

A plurality of openings (contact holes) are delineated in a portion of the passivation film so as to expose a plurality of electrode layers, implementing the bonding pads 81a to 81k. Alternatively, the bonding pads 81a to 81k may be formed as other metal patterns connected to a plurality of electrode layers by using metal wiring. In addition, it is possible to form bonding pads 81a to 81k on the polysilicon gate electrodes using a metal film such as aluminum (Al) or an aluminum alloy (Al—Si, Al—Cu—Si). Alternatively, a plurality of other bonding pads may be connected, via a plurality of signal lines such as gate wirings, to the polysilicon gate electrodes. Instead of polysilicon, gate electrodes made of a refractory metal such as tungsten (W), titanium (Ti), or molybdenum (Mo), a silicide (i.e. $WSi_2$, $TiSi_2$, $MoSi_2$), or a polycide containing any of these suicides can be used.

Figure 11:
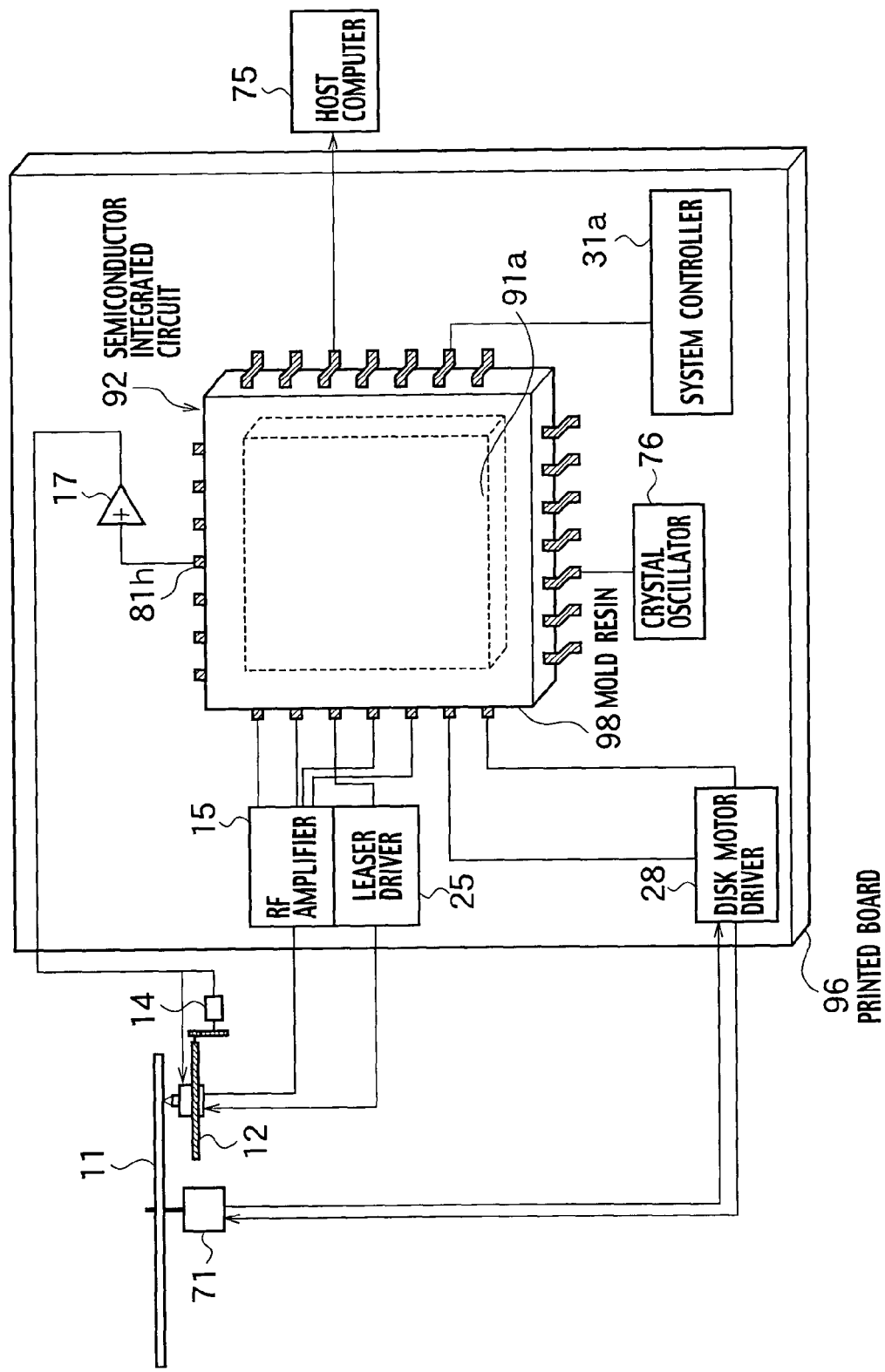
FIG. 11 is a schematic diagram showing a mounting example of the semiconductor integrated circuit according to the second embodiment of the present invention.

As shown in FIG. 11, the semiconductor integrated circuit 91a shown in FIG. 10 is covered by a mold resin 98, and a packaged semiconductor integrated circuit 92 is formed. Furthermore, as shown in FIG. 11, the packaged semiconductor integrated circuit 92 is implemented on printed board 96.

(Second Embodiment)

Figure 12:
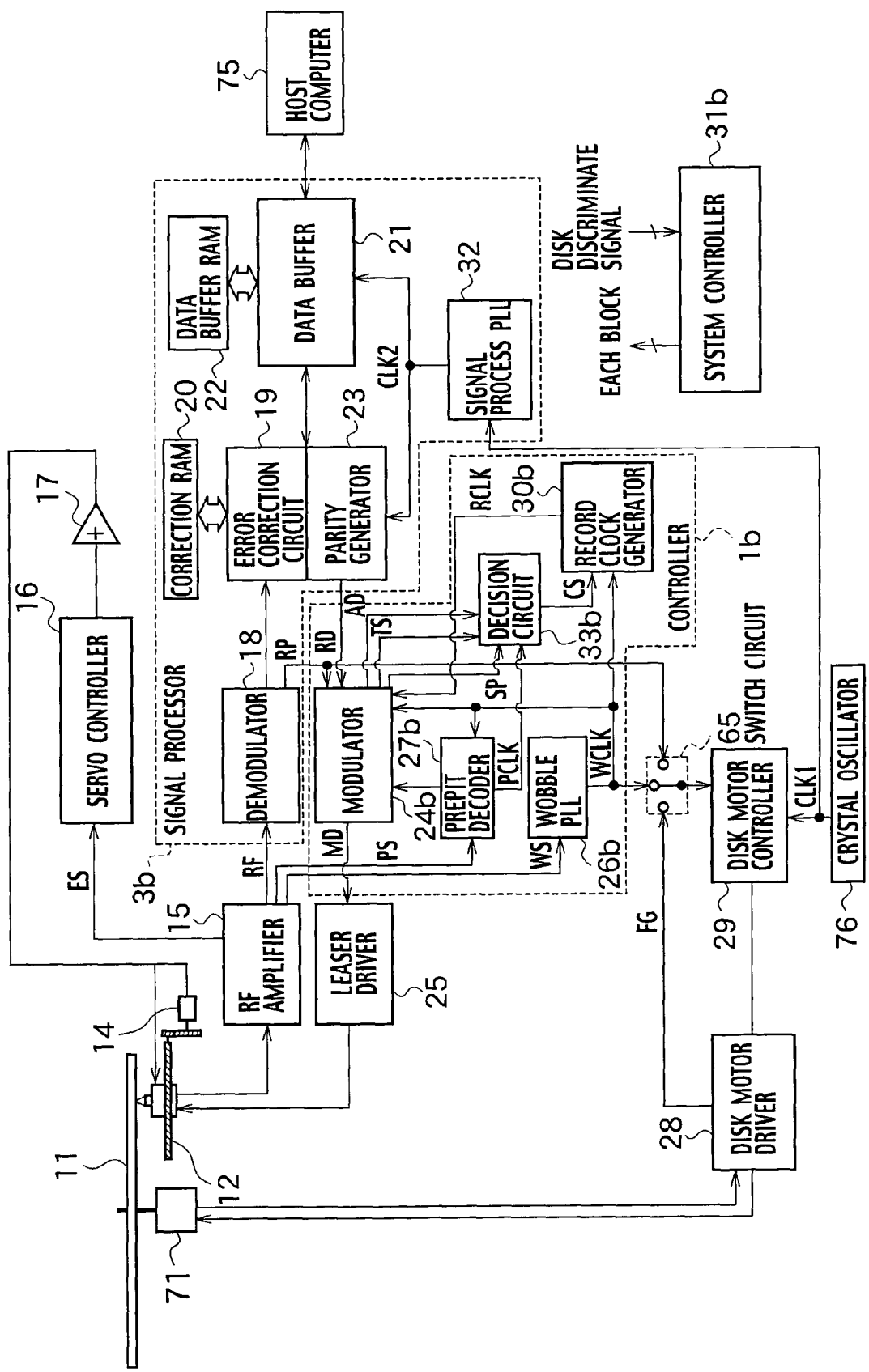
FIG. 12 is a block diagram showing an optical disk drive according to a second embodiment of the present invention.
Figure 13:
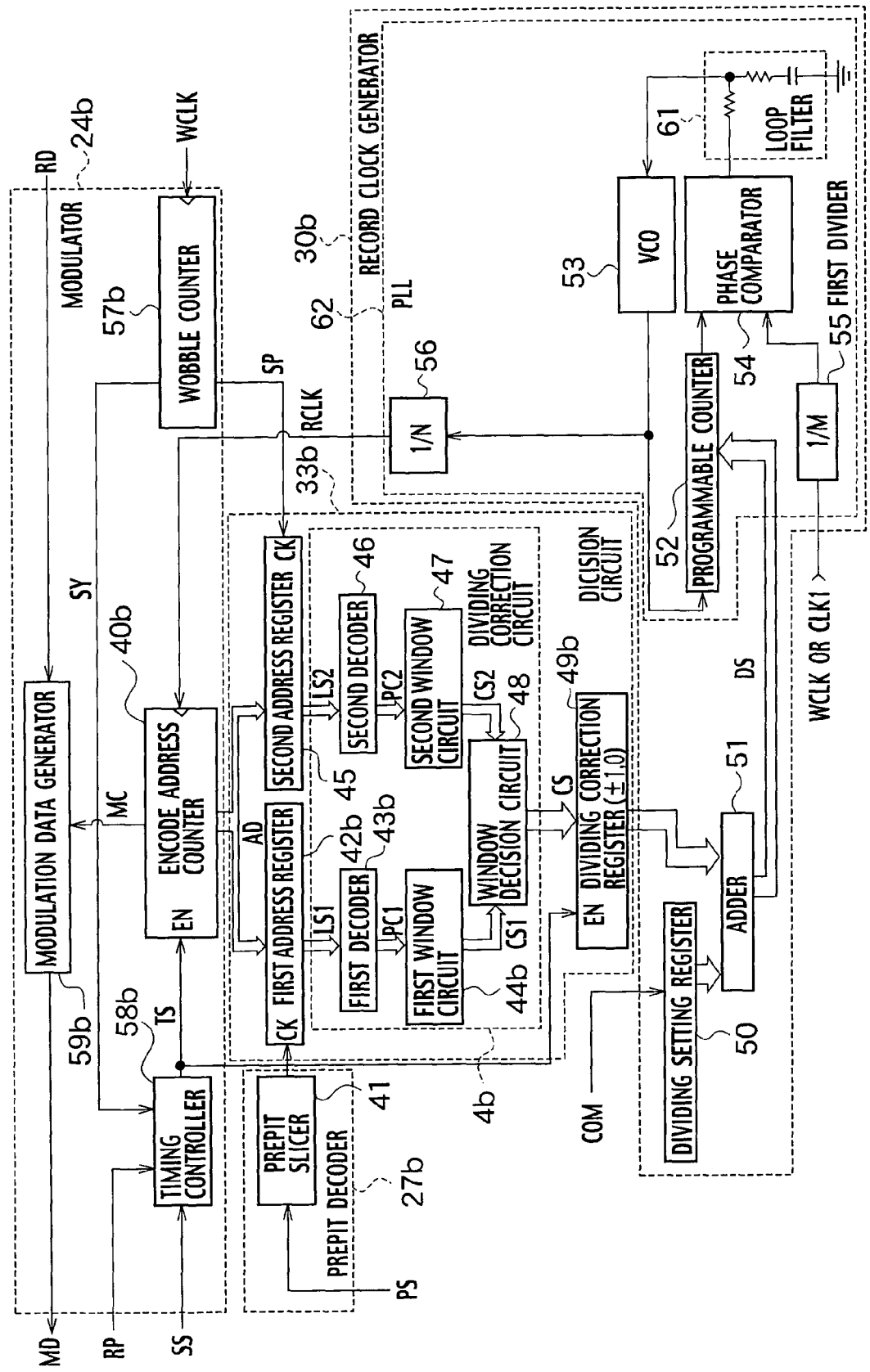
FIG. 13 is a block diagram showing a controller for the optical disk drive according to the second embodiment of the present invention.

As shown in FIG. 12, an optical disk drive according to a second embodiment of the present invention is different from the optical disk drive shown in FIG. 4 in that the modulator 24b further generates a sector pulse SP, which is a pulse of a sector interval of the optical disk 11. A decision circuit 33b determines whether or not recording is performed in accordance with the standards by use of the address information AD, the prepit clock PCLK, and the sector pulse SP. As shown in FIG. 13, the sector pulse SP is generated when the wobble counter 57b of the modulator 24b counts the wobble clock WCLK.

As shown in FIG. 13, the decision circuit 33b includes an address register 42a having a clock input terminal CK connected to the prepit decoder 27a and an input side connected to the modulator 24a, a dividing correction circuit 4a connected to the address register 42a, and a dividing correction register 49a having a enable terminal EN connected to the timing controller 58a and an input side connected to the dividing correction circuit 4a. The first address register 42b latches the address information AD in synchronization with the prepit clock PCLK and generates a first latch signal LS1. The second address register 45 latches the address information AD of the modulation data MD in synchronization with the sector pulse SP and generates a second latch signal LS2. The dividing correction circuit 4b generates dividing correction signal CS based on the first and second latch signals LS1 and LS2. The dividing correction register 49b latches the dividing correction signal CS when the timing signal TS is effective.

The dividing correction circuit includes a first decoder 43b connected to the first address register 42b, a second decoder 46 connected to the second address register 45, a first window circuit 44b connected to the first decoder 43b, a second window circuit 47 connected to the second decoder 46, and a window decision circuit 48 connected to the first window circuit 44b and the second window circuit 47. The first decoder 43b generates a first phase characteristic PC1 as the phase characteristic from the first latch signal LS1. The second decoder 46 generates a second phase characteristic PC2 as the phase characteristic from the second latch signal LS2. The first window circuit 44b compares the first phase characteristic PC1 to a window value and generates a first dividing correction signal CS1. The second window circuit 47 compares the second phase characteristic PC2 to a window value and generates a second dividing correction signal CS2. The window decision circuit 48 selects either one of the first and second dividing correction signals CS1 and CS2. Specifically, the window decision circuit 48 normally selects the second dividing correction signal CS2 and, when the second dividing correction signal CS2 is "0", selects the first dividing correction signal CS1.

As shown in FIG. 14A, between the previously recorded data on the optical disk 11 and data to be newly recorded, a link position is determined by the standards. Specifically, in the case of recording new data on the previously recorded data, the link position is determined by the standards to be at 16th byte of a first sector. Recording accuracy is required to be the ±1 byte on the basis of the 16th byte of the first sector. The controller 1b detects an initial point of the sector by counting the wobble signal WS shown in FIG. 14B and determines timing for generating the modulation data MD. Note that one ECC block of the record data RD includes 16 sectors.

Next, an operation of the controller 1b according to the second embodiment of the present invention will be described by use of FIGS. 12 to 14B. Repeated descriptions for the same operations according to the second embodiment which are the same as the first embodiment of the present invention are omitted.

Figure 16A:
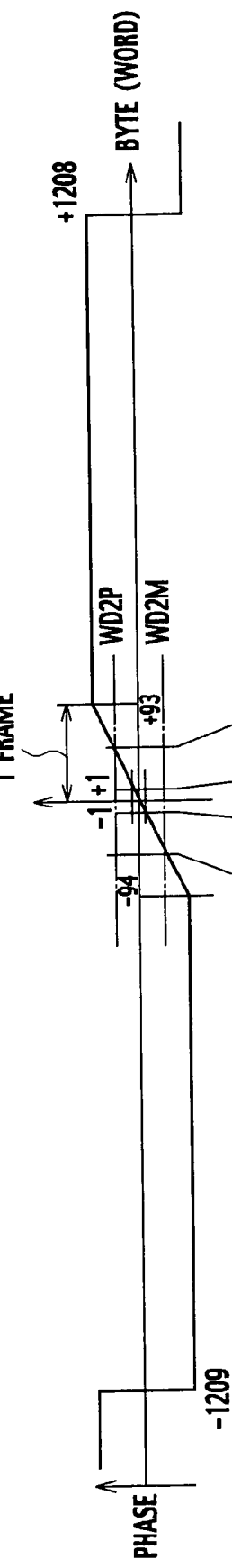
FIGS. 16A and 16B are schematic diagram showing a function of a decision circuit according to the second embodiment of the present invention.
Figure 16B:
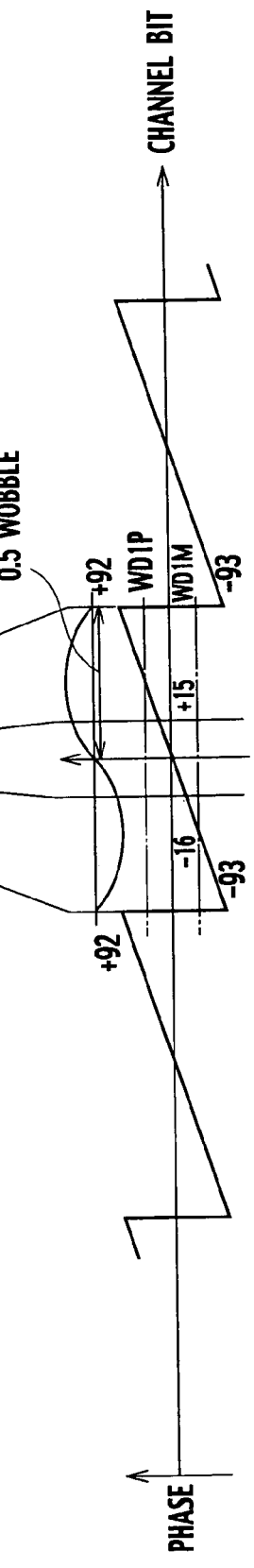

(A) The RF amplifier 15 generates the wobble signal WS and the prepit signal PS as shown in FIGS. 15A and 15B, respectively. The wobble counter 57b shown in FIG. 13 generates the sector pulse SP by counting the wobble clock WCLK. The address information AD of the modulation data MD is supplied to the first and second address registers 42b and 45. As shown in FIG. 15C, the first address register 42b latches the address value AD by use of the prepit clock PCLK. On the other hand, as shown in FIG. 15D, the second address register 45 latches the address value AD by use of the sector pulse SP. The second latch signal LS2 will be a value obtained by expressing one sector by byte, as shown in FIG. 16A. One sector is 2418 bytes as expressed in bytes.

(B) Next, the first and second decoders 43b and 46 generate the first and second phase characteristics PC1 and PC2 from the first and second latch signals LS1 and LS2, respectively. The first and second phase characteristics PC1 and PC2 are supplied to the first and second window circuits 44b and 47, respectively. Here, it is assumed that the positive and negative window values of the first window circuit 44b are set to "+4" and "−4", respectively. Moreover, it is assumed that the positive and negative window values of the second window circuit 47 are set to "+5" and "−5", respectively. In the period of times t1 to t4, as shown in FIG. 15D, the phase characteristic PC generated by the second decoder 46 is "+1", which is between the negative window value and the positive window value of the second window circuit 47, inclusive. Therefore, the second window circuit 47 generates "0". Since the second dividing correction signal CS2 is "0", the window decision circuit 48 latches the first dividing correction signal CS1. As a result, the window decision circuit 48 outputs "+1" at time t3.

(C) In the period of times t5 to t8, the second phase characteristic PC2 shown in FIG. 15D is "−9", which is smaller than the negative window value of the second window circuit 47. The second window circuit 47 generates "+1" in the period of times t5 to t8. In the period of times t5 to t8, the window decision circuit 48 ignores the first dividing correction signal CS1 since the second dividing correction signal CS2 is not "0". As a result, as shown in FIG. 15F, the window decision circuit 48 outputs "−1" as the dividing correction signal CS in the period of times t5 to t8. The values "−1", "0" and "+1" generated by the window decision circuit 48 are latched by the dividing correction register 49b. The record clock generator 30b generates the record clock RCLK based on the dividing correction signal CS generated by the dividing correction register 49b.

As described above, according to the second embodiment, first, by adjusting positions of the record sync and the prepits by sector, the positions of the record sync and the prepits are allowed to roughly coincide with each other. Thereafter, fine adjustment of the positional relationship between the record sync and the prepits is performed. Therefore, even if the link position drastically deviates from the standards, new data can be recorded in original data positions, as prescribed by the standards.

Figure 17:
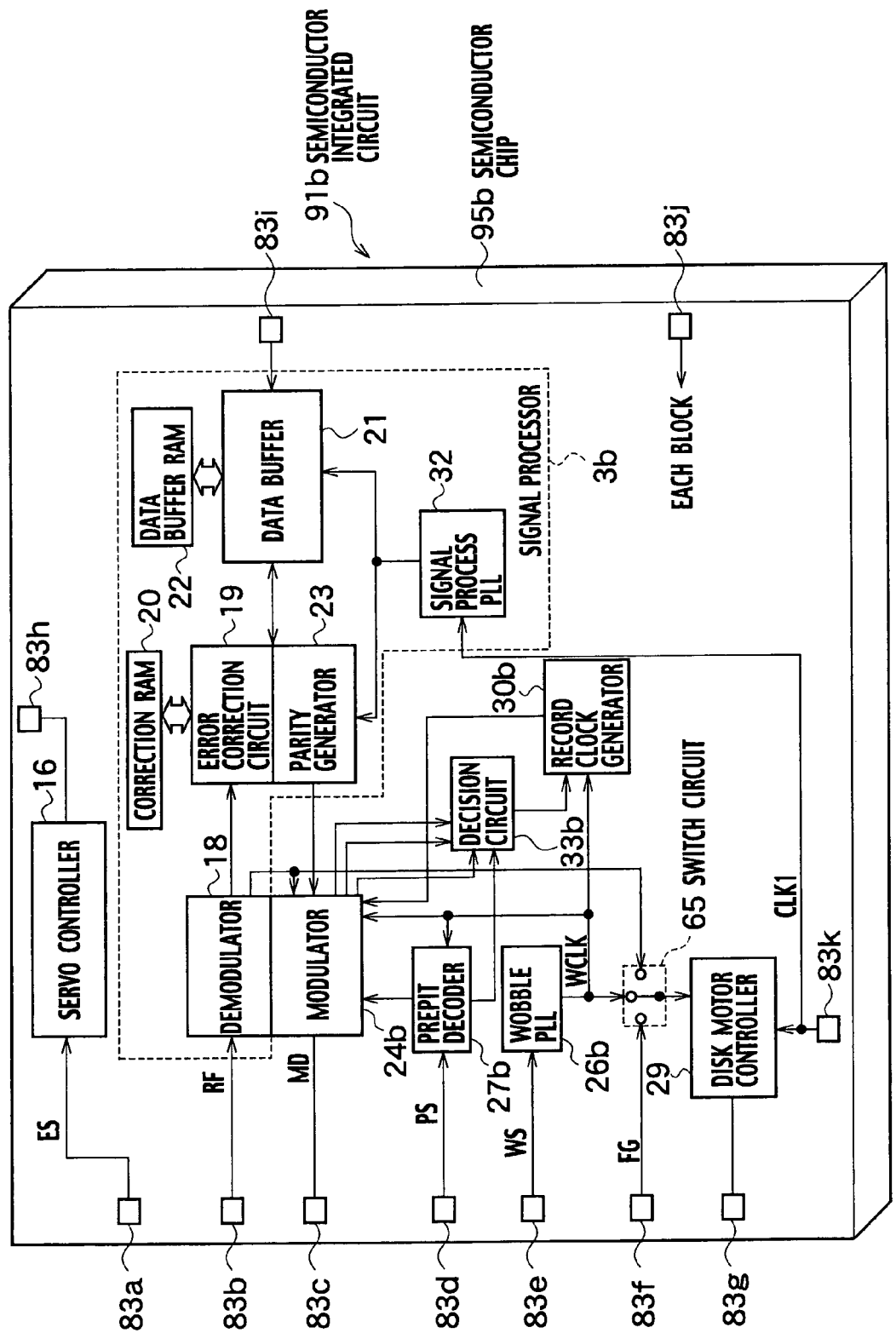
FIG. 17 is a schematic diagram showing a configuration integrated the controller according to the second embodiment of the present invention monolithically on the same semiconductor chip.

As shown in FIG. 17, for example, the modulator 24b, the prepit decoder 27b, wobble PLL 26b, the decision circuit 33b, and the record clock generator 30b can be monolithically integrated on a semiconductor chip 95b and a semiconductor integrated circuit 91b can be formed. In the example shown in FIG. 17, the semiconductor integrated circuit 91b further includes the servo controller 16, the signal processor 3b, the disk motor controller 29, and bonding pads 83a to 83k.

(Other Embodiments)

Various modifications will become possible for those skilled in the art after receiving the teachings of the present disclosure without departing from the scope thereof.

Figure 18:
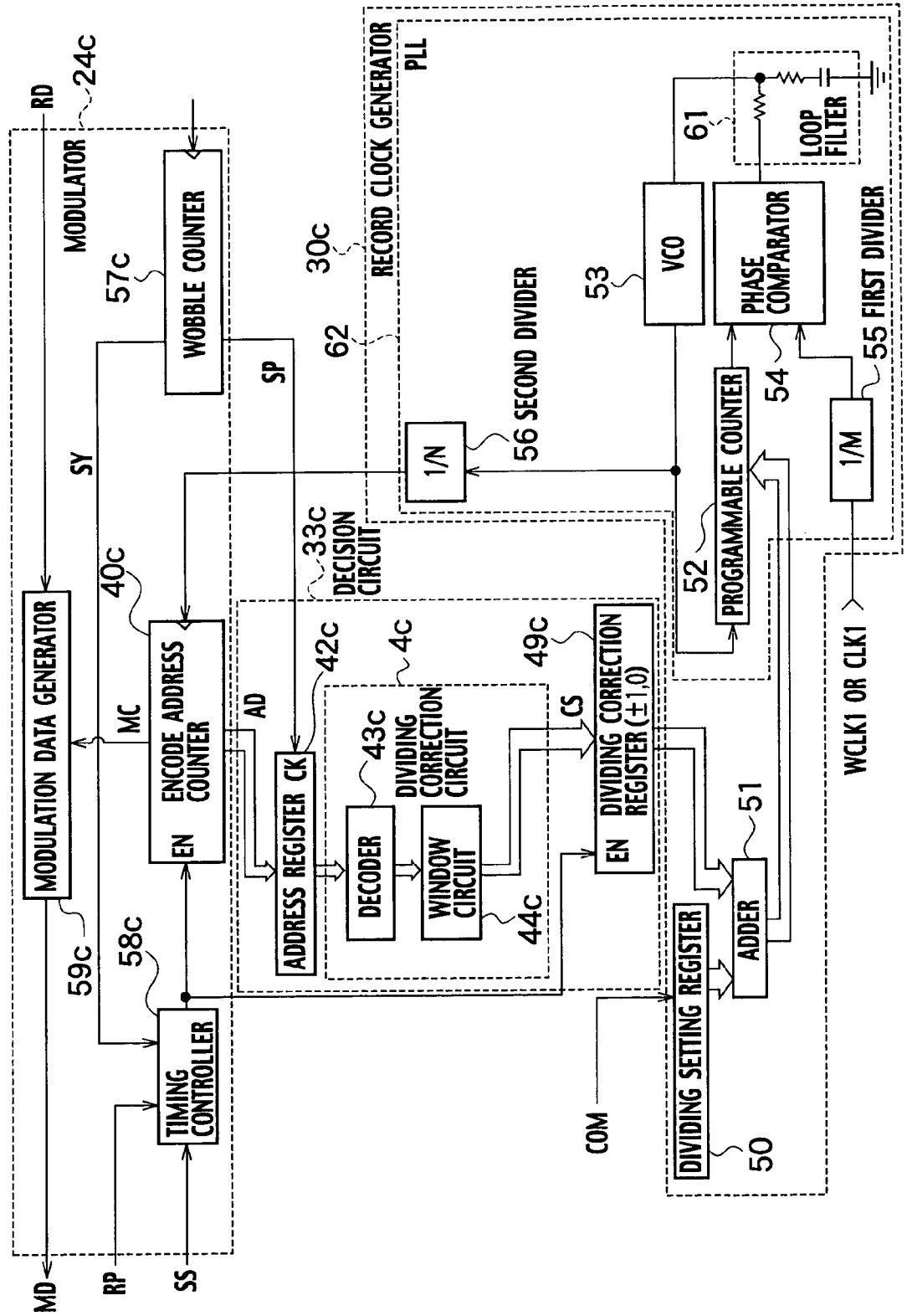
FIG. 18 is a block diagram showing a controller for an optical disk drive according to other embodiments of the present invention.

In the first embodiment, the description was given that the decision circuit 33a determines only the phases of the record data RD and the prepit signal PS. In the second embodiment, the description was given that the decision circuit 33b determines the phases of the record data RD and each of the prepit signal PS and the sector interval. However, as shown in FIG. 18, the decision circuit 33c may determine only the phases of the record data RD and the sector interval. That is, the decision circuit 33c may includes an address register 42c having a clock input terminal CK connected to the wobble counter 57c and an input side connected to the encode address counter 40c, a decoder 43c connected to the address register 42c, a window circuit 44c connected to the decoder 43c, a dividing correction register 49c having an enable terminal EN connected to the timing controller 58c and an input side connected to the window circuit 44c. Moreover, in a DVD+R/RW, although there is no prepit, the record data RD and the modulation data MD are recorded by a sector interval similarly to a DVD-R/RW. Therefore, it is needless to say that the present invention can be applied to a DVD+R/RW drive.

In each of the first and second embodiments, description was given of an example in which the RF amplifier 15, the laser driver 25 and the system controller 31a or 31b are not integrated on the single semiconductor chip 95a or 95b. However, it is possible to have a configuration of a single chip system LSI by further integrating the RF amplifier 15, the laser driver 25 and the system controller 31a or 31b on the single semiconductor chip 95a or 95b. Moreover, the data buffer RAM 22 of the semiconductor integrated circuits (in a chip state) 91a and 91b according to the first and second embodiments, respectively, can also be an external component without being integrated on the single semiconductor chips 95a and 95b.

In the first and second embodiments, the description was given of the case where the system controllers 31a and 31b generate the phase decision timing pulse TP used in window processing, respectively. However, a phase decision timing pulse generator using the prepit signal PS as its input signal may be additionally included in the prepit decoders 27a and 27b.

What is claimed is:

1. A controller for an optical disk drive, comprising:
    a modulator configured to modulate record data to be recorded on an optical disk based on a record clock which is a reference clock for recording, and to generate modulation data and address information of the modulation data;
    a prepit decoder configured to generate a prepit clock from a prepit signal detected from the optical disk; and
    a decision circuit configured to determine whether recording in accordance with a standard is performed, from a phase characteristic based on the address information and the prepit clock, and to control a frequency of the record clock,
    the decision circuit comprising,
        an address register configured to latch the address information in synchronization with the prepit clock, and
        a decoder configured to generate the phase characteristic from the latched address information.

2. The controller of claim 1, wherein the prepit decoder comprises a prepit slicer configured to generate the prepit clock by subjecting the prepit signal to waveform shaping.

3. The controller of claim 1, further comprising:
    a wobble PLL configured to generate a wobble clock based on a wobble signal detected from the optical disk; and
    a record clock generator configured to generate the record clock.

4. The controller of claim 3, wherein the modulator comprises:
    a wobble counter configured to generate a sector synchronization signal by counting the wobble clock;
    a timing controller configured to generate a timing signal in synchronization with either one of the sector synchronization signal and a reproducing synchronization signal obtained from previously recorded data on the optical disk;
    an encode address counter configured to generate a modulation control signal and the address information by counting the record clock when the timing signal is effective; and
    a modulation data generator configured to modulate the record data based on the modulation control signal.

5. The controller of claim 4, wherein the wobble counter further generates a sector pulse by an interval of a sector of the optical disk.

6. The controller of claim 4, wherein the decision circuit comprises:
    a dividing correction circuit configured to generates a dividing correction signal based on the latched address information; and
    a dividing correction register configured to latch the dividing correction signal when the timing signal is effective.

7. The controller of claim 6, wherein the dividing correction circuit comprises:
    a window circuit configured to generate the dividing correction signal by comparing the phase characteristic to a window value.

8. The controller of claim 7, wherein the window circuit has a positive window value and a negative window value as the window value.

9. The controller of claim 6, wherein the record clock generator comprises:
    a dividing setting register configured to generate a reference dividing signal in accordance with a command;
    an adder configured to generate a dividing control signal by adding the reference dividing signal and the dividing correction signal; and
    a PLL configured to generate the record clock based on the dividing control signal.

10. The controller of claim 9, wherein the PLL comprises:
    a VCO configured to generate an oscillation clock by oscillating at a frequency corresponding to a control voltage;
    a programmable counter configured to change a dividing ratio by applying the dividing control signal, and to divide the oscillation clock;
    a first divider configured to generate a dividing clock by dividing either of a reference clock and the wobble clock;
    a phase comparator configured to generate the control voltage in accordance with a phase difference between the divided oscillation clock and the dividing clock;
    a loop filter configured to extract a low frequency component of the control voltage, and to supply the low frequency component to the VCO; and
    a second divider configured to generate the record clock by dividing the oscillation clock.

11. A controller for an optical disk drive, comprising:
    a modulator configured to modulate record data to be recorded on an optical disk based on a record clock which is a reference clock for recording, and to generate modulation data and address information of the modulation data;

a wobble PLL configured to generate a wobble clock based on a wobble signal detected from the optical disk;

a wobble counter configured to count the wobble clock, and to generate a sector pulse by an interval of a sector of the optical disk;

a decision circuit configured to determine whether recording in accordance with a standard is performed, from a phase characteristic based on the address information and the sector pulse, and to control a frequency of the record clock, said decision circuit comprising, an address register configured to latch the address information in synchronization with the sector pulse, and a decoder configured to generate the phase characteristic from the latched address information.

12. The controller of claim 11, wherein the decision circuit further comprises:

a window circuit configured to generate a dividing correction signal by comparing the phase characteristic to a window value; and a dividing correction register configured to latch the dividing correction signal when a timing signal is effective.

13. The controller of claim 12, wherein the window circuit has a positive window value and a negative window value as the window value.

14. The controller of claim 12, wherein the record clock generator comprises:

a dividing setting register configured to generate a reference dividing signal in accordance with a command;

an adder configured to generate a dividing control signal by adding the reference dividing signal and the dividing correction signal; and a PLL configured to generate the record clock based on the dividing control signal.

15. The controller of claim 14, wherein the PLL comprises:

a VCO configured to generate an oscillation clock by oscillating at a frequency corresponding to a control voltage;

a programmable counter configured to change a dividing ratio by use of the dividing control signal, and to divide the oscillation clock;

a first divider configured to generate a dividing clock by dividing either a reference clock and the wobble clock;

a phase comparator configured to generate the control voltage in accordance with a phase difference between the divided oscillation clock and the dividing clock;

a loop filter configured to extract a low frequency component of the control voltage, and to supply the low frequency component to the VCO; and a second divider configured to generate the record clock by dividing the oscillation clock.

16. A controller for an optical disk drive, comprising:

a modulator configured to modulate record data to be recorded on an optical disk based on a record clock which is a reference clock for recording, and to generate modulation data and address information of the modulation data;

a prepit decoder configured to generate a prepit clock from a prepit signal detected from the optical disk;

a wobble PLL configured to generate a wobble clock based on a wobble signal detected from the optical disk;

a wobble counter configured to count the wobble clock, and to generate a sector pulse by an interval of a sector of the optical disk; and a decision circuit configured to determine whether recording in accordance with a standard is performed, from a phase characteristic based on the address information, the prepit clock, and the sector pulse, and to control a frequency of the record clock, said decision circuit comprising, a first address register configured to latch the address information in synchronization with the prepit clock, and to generate a first latch signal, a second address register configured to latch the address information in synchronization with the sector pulse and to generate a second latch signal, a first decoder configured to generate a first phase characteristic as the phase characteristic from the first latch signal, and a second decoder configured to generate a second phase characteristic as the phase characteristic from the second latch signal.

17. The controller of claim 16, wherein the dividing correction circuit comprises:

a first window circuit configured to compare the first phase characteristic to a window value, and to generate a first dividing correction signal;

a second window circuit configured to compare the second phase characteristic to a window value, and to generate a second dividing correction signal; and a window decision circuit configured to select either one of the first and second dividing correction signals.

18. The controller of claim 17, wherein the record clock generator comprises:

a dividing setting register configured to generate a reference dividing signal in accordance with a command;

an adder configured to generate a dividing control signal by adding up the reference dividing signal and the dividing correction signal selected by the window decision circuit; and a PLL configured to generate the record clock based on the dividing control signal.

19. A semiconductor integrated circuit comprising:

a modulator integrated on a semiconductor chip and configured to modulate a record data to be recorded on a optical disk based on a record clock that is a reference clock for recording, and to generate a modulation data and an address information of the modulation data;

a prepit decoder integrated on the semiconductor chip and configured to generate a prepit clock from a prepit signal detected from the optical disk; and a decision circuit integrated on the semiconductor chip and configured to determine whether or not recording in accordance with a standard is performed, from phase characteristic based on the address information and the prepit clock, and to control a frequency of the record clock, said decision circuit comprising, an address register configured to latch the address information in synchronization with the prepit clock, and a decoder configured to generate the phase characteristic from the latched address information.

20. An optical disk drive comprising:

a pickup configured to read light reflected from an optical disk, the reflected light generated by irradiating a laser beam on the optical disk, and to generate a prepit signal and a wobble signal;

a controller configured to determine whether recording in accordance with an established standards is performed, from phase characteristic based on the prepit signal and the wobble signal, and to modulate record data to be recorded on the optical disk, said controller comprising, a modulator configured to modulate the record data based on a record clock that is a reference clock for recording, and to generate a modulation data and an address information of the modulation data, a prepit decoder configured to generate a prepit clock from the prepit signal, and a decision circuit configured to determine whether or not recording in accordance with the standard is performed, from the phase characteristic based on the address information and the prepit clock, and to control a frequency of the record clock, said decision circuit comprising, an address register configured to latch the address information in synchronization with the prepit clock, a decoder configured to generate the phase characteristic from the latched address information; and a signal processor configured to supply the record data to the controller.

21. A semiconductor integrated circuit comprising:

a modulator integrated on a semiconductor chip and configured to modulate record data to be recorded on an optical disk based on a record clock which is a reference clock for recording, and to generate modulation data and address information of the modulation data;

a wobble PLL integrated on a semiconductor chip and configured to generate a wobble clock based on a wobble signal detected from the optical disk;

a wobble counter integrated on a semiconductor chip and configured to count the wobble clock, and to generate a sector pulse by an interval of a sector of the optical disk; and a decision circuit integrated on a semiconductor chip and configured to determine whether recording in accordance with a standard is performed, from a phase characteristic based on the address information and the sector pulse, and to control a frequency of the record clock, said decision circuit comprising, an address register configured to latch the address information in synchronization with the sector pulse, and a decoder configured to generate the phase characteristic from the latched address information.

22. An optical disk drive comprising:

a pickup configured to read light reflected from an optical disk, the reflected light generated by irradiating a laser beam on the optical disk, and to generate a wobble signal;

a controller configured to determine whether recording in accordance with an established standards is performed, and to modulate record data to be recorded on the optical disk, said controller comprising, a modulator configured to modulate the record data based on a record clock that is a reference clock for recording, and to generate a modulation data and an address information of the modulation data, a wobble PLL configured to generate a wobble clock based on a wobble signal detected from the optical disk, a wobble counter configured to count the wobble clock, and to generate a sector pulse by an interval of a sector of the optical disk, a decision circuit configured to determine whether recording in accordance with a standard is performed, from a phase characteristic based on the address information and the sector pulse, and to control a frequency of the record clock, said decision circuit comprising, an address register configured to latch the address information in synchronization with the sector pulse, and a decoder configured to generate the phase characteristic from the latched address information; and a signal processor configured to supply the record data to the controller.

* * * * *